United States Patent
Yoo et al.

(10) Patent No.: US 7,768,416 B2
(45) Date of Patent: Aug. 3, 2010

(54) METHOD OF MANAGING OPERATION OF LAUNDRY ROOM MACHINE AND MACHINE THEREFOR

(75) Inventors: Hea-Kyung Yoo, Changwon-shi (KR); Tae-Hoon Lim, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 298 days.

(21) Appl. No.: 11/753,030

(22) Filed: May 24, 2007

(65) Prior Publication Data

US 2008/0006506 A1 Jan. 10, 2008

(30) Foreign Application Priority Data

May 26, 2006 (KR) ...................... 10-2006-0047739

(51) Int. Cl.
   G08B 21/00 (2006.01)
   G06F 17/00 (2006.01)
   G06K 5/00 (2006.01)
(52) U.S. Cl. .................. 340/679; 700/236; 235/382
(58) Field of Classification Search ................ 340/679; 700/236; 235/382
   See application file for complete search history.

(56) References Cited

U.S. PATENT DOCUMENTS

| | | | |
|---|---|---|---|
| 4,523,285 A | 6/1985 | Hendrickson et al. | |
| 5,386,362 A | 1/1995 | Keret | |
| 5,859,778 A * | 1/1999 | Kuroda et al. | 700/169 |
| 6,883,709 B2* | 4/2005 | Joseph | 235/381 |
| 7,561,559 B2* | 7/2009 | Hannel et al. | 370/350 |
| 2002/0116208 A1* | 8/2002 | Chirnomas | 705/1 |
| 2003/0058101 A1 | 3/2003 | Watanabe et al. | 340/540 |

OTHER PUBLICATIONS

Chinese Office Action dated May 8, 2009.
German Office Action dated Mar. 9, 2010 and English translation.

* cited by examiner

*Primary Examiner*—Benjamin C Lee
*Assistant Examiner*—Andrew Bee
(74) *Attorney, Agent, or Firm*—KED & Associates, LLP

(57) ABSTRACT

A method of managing the operation of machines that perform washing and drying operations according to payment made by customers is provided. The method includes recording operating information of a laundry room machine, and transmitting at least one of recorded times and recorded operating information of the laundry room machine in response to a request from a communicator.

9 Claims, 5 Drawing Sheets

METHOD OF MANAGING OPERATION OF LAUNDRY ROOM MACHINE AND MACHINE THEREFOR

TECHNICAL FIELD

The present invention relates to a method of managing the operation of a laundry room machine for performing a washing operation and a drying operation according to a payment made by customers, and more particularly, to a method of managing the operation of a laundry room machine for conveniently managing the operating information of the laundry room machine and, and a machine therefor.

BACKGROUND ART

In general, a laundry room machine is an appliance used for cleaning the laundry such as clothes and beddings. The laundry room machine automatically washes, rinses, and spindries the laundry, and dries the laundry with hot air to quickly dry the laundry. The laundry room machine includes a washer, a dryer, and an all-in-one washer and dryer.

Such laundry room machines may be classified into a domestic laundry room machine and a commercial laundry room machine.

The domestic laundry room machine is disposed a private place such as home and generally used for washing the laundry of family members.

On the contrary, the commercial laundry room machine is disposed at a public place such as a business building and rented to customers at a predetermined rate. Compared with the domestic laundry room machine, the commercial laundry room machines are frequently used by many customers. Therefore, the commercial laundry room machines need to be designed and manufactured to have superior stability and maintainability. Also, the commercial laundry room machines are designed to have a manager mode for enabling managers to set various operating conditions.

In order to maximize benefit and convenience, the commercial laundry room machine needs a device for handling a payment made by customers for using the laundry room machine and a control algorithm thereof. The commercial laundry room machine also needs a manager mode to protect the laundry room machine from being damaged by customers, to prevent the parts thereof from being lost, and to conveniently and quickly repair the laundry room machine.

A commercial laundry room is generally equipped with a plurality of washers and dryers. Each of the washers and the dryers includes a payment device such as a coin drop assembly for collecting coins or a card reader for collecting electric payments from various cards. When a customer inputs a payment into the payment device, a predetermined operating time is assigned to the washer or the dryer in correspondence with the inputted payment, and the washer or the dryer performs a predetermined operation during the assigned operating time.

While performing the predetermined operation, the laundry room machines record the operating information thereof in a control unit. In order to collect the operating information recorded in the laundry room machines, a manager must walk to each of the laundry room machines, controls each of them to display the recorded operating information, and collects the operating information manually. It is very annoying operation for a manager. Also, it is very difficult to read, modify, and manage the collected operating information of the laundry room machines.

DISCLOSURE OF THE INVENTION

The present invention is achieved to solve the above problems. An object of the present invention is to provide a laundry room management method for conveniently collecting and managing operating information recorded in laundry room machines although a laundry room includes a plurality of laundry room machines.

Another object of the present invention is to provide a laundry room machine management method for detecting an unpermitted operation of activating a manager mode based on a duration time of the manager mode that allows a manager to collect payments as well as operating information of a laundry room machine.

In order to achieve the above-described objects of the invention, there is provided a method of managing laundry room machines, which use a laundry room machine disposed in a laundry room for performing at least one of a washing operation and a drying operation, a payment device disposed at the laundry room machine for collecting a payment for operating the laundry room machine, and a communicator for setting operating conditions of the laundry room machine and collecting operating information of the laundry room machine, and includes the steps of: receiving information from the payment device and activating a manager mode, and deactivating the manager mode by receiving information from the payment device, where a time of activating the manager mode or deactivating the manager mode is recorded, the method including the step of: a) recording operating information of a laundry room machine; and b) transmitting at least one of recorded times and recorded operating information of the laundry room machine in response to a request of a communicator.

In another aspect of the present invention, there is provided a commercial laundry room machine, including: a first interface for communicating payment collecting information with a payment device disposed at the laundry room machine; a second interface for communicating operating information of the laundry room machine with a communicator; and a controller for controlling operation of the laundry room machine according to communicating information of the first and second interfaces, and transmitting operating information of the laundry room machine to the communicator in response to a request of the communicator.

BRIEF DESCRIPTION OF THE DRAWINGS

The present invention will become better understood with reference to the accompanying drawings which are given only by way of illustration and thus are not limitative of the present invention, wherein.

BEST MODE FOR CARRYING OUT THE INVENTION

A method of managing the operation of a laundry room machine and a machine therefor in accordance with preferred embodiments of the present invention will now be described in detail with reference to the accompanying drawings.

Figure 1:
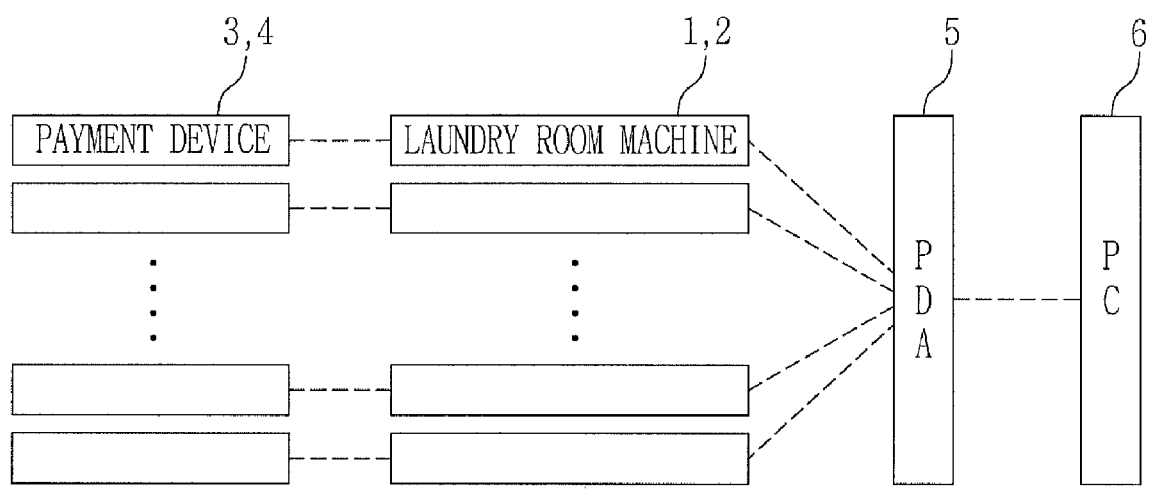
FIG. 1 is a diagram illustrating a commercial laundry room system according to an embodiment of the present invention.
Figure 2:
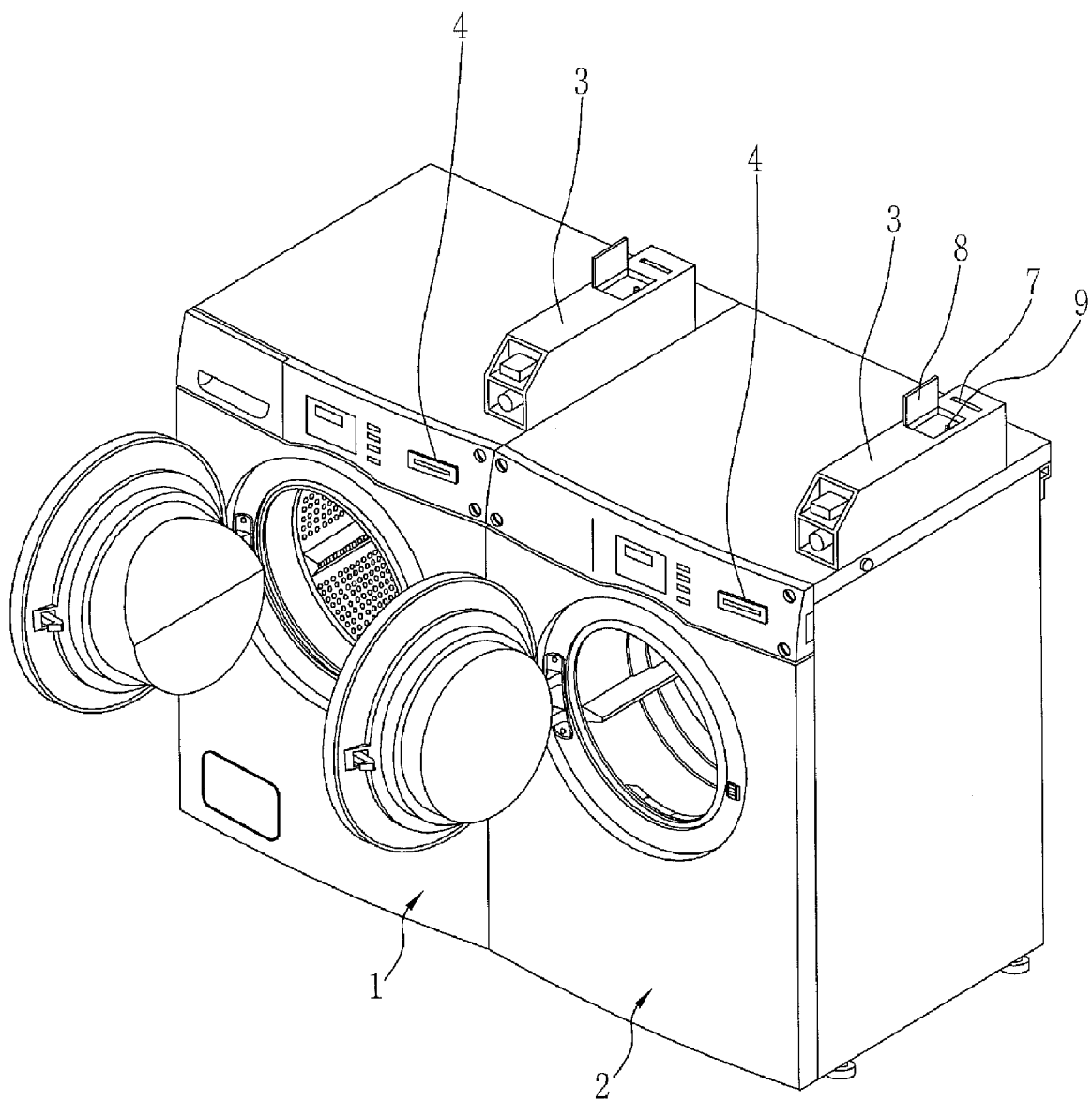
FIG. 2 is a perspective view of a commercial laundry room machine according to an embodiment of the present invention.

FIG. 1 is a diagram illustrating a commercial laundry room system according to an embodiment of the present invention, and FIG. 2 is a perspective view of a commercial laundry room machine according to an embodiment of the present invention.

As shown in FIG. 1 and FIG. 2, the commercial laundry room system includes laundry room machines such as a washer 1 for removing pollutions from the laundry by washing, rinsing, and spin-drying the laundry using water, a detergent, and mechanical power, and a dryer 2 for drying the wet laundry using hot air and mechanical power. Each of the laundry room machines 1 and 2 includes a payment device such as a card reader 3 and a coin drop assembly 4. Furthermore, the laundry room system includes a communicator 5 such as a personal digital assistant (PDA) for setting the operation conditions of the laundry room machines 1 and 2 and receiving the operating information from the laundry room machines 1 and 2, and a personal computer PC 6 for managing the operating information from the communicator 5. The communicator 5 and the computer 6 enable a manager to conveniently manage a plurality of the laundry room machines simultaneously. Each of the laundry room machines 1 and 2 includes an interface to communicate with the payment devices 3 and 4 and the communicator 5.

Recently, an all-in-one washer and dryer was introduced. Although the all-in-one washer and dryer can dry the laundry as well as wash, rinse, and spin-dry, the all-in-one washer and dryers have not been frequency used for a commercial purpose because the drying capacity thereof is comparatively smaller than the washing capacity thereof, the price is relatively high, and the structure is complicated.

In general, a commercial laundry room is equipped with a plurality of commercial washers 1 and commercial dryers 2 for accommodating a plurality of customers and maximizing the business benefit. Each of the washers 1 and the dryers 2 include a coin drop assembly 3 and a card reader 4 for collecting and handling a payment from customers.

The coin drop assembly 3 is a device for collecting coins inserted by customer as a payment. Since it is required for the coin drop assembly 3 to store a lot of coins and to mechanically process the stored coins, the coin drop assembly 3 generally has a large external shape and a heavy weight. Therefore, the coin drop assembly 3 is disposed on a top side of the washer 1 and the dryer 2. On the contrary, the card reader 4 is a device for collecting an electric payment that is made through a magnetic card or an integrated circuit (IC) card. Since the card reader 4 electrically reads and processes the cards, the card reader 4 is internally disposed in the washer 1 and the dryer 2.

In order to maximize the convenience of customers, the washers and the dryers generally include the both of the coin drop assembly 3 and the card reader 4.

Since the laundry room machines 1 and 2 are used for a commercial purpose, the laundry room machines 1 and 2 provide a management mode to enable a manager to set operating conditions of the washer 1 and the dryer 2 such as the rate and operating times, and to repair the washer 1 and the dryer. A manager can set the laundry room machines 1 and 2 to enter the manager mode through the communicator 5. However, a manager generally sets the laundry room machines to enter the manger mode by turning a service door key after inserting the service door key into a key hole 7 formed at the coin drop assembly 3 or inserting a service card into the card reader 4.

When a manager turns the service door key after inserting the service door key into the key hole 7, a contact door 8 of the coin drop assembly 3 opens and the opened contact door 8 releases a limit switch 9 to enable a manager to pull out a coin box from the coin drop assembly 3.

Figure 3:
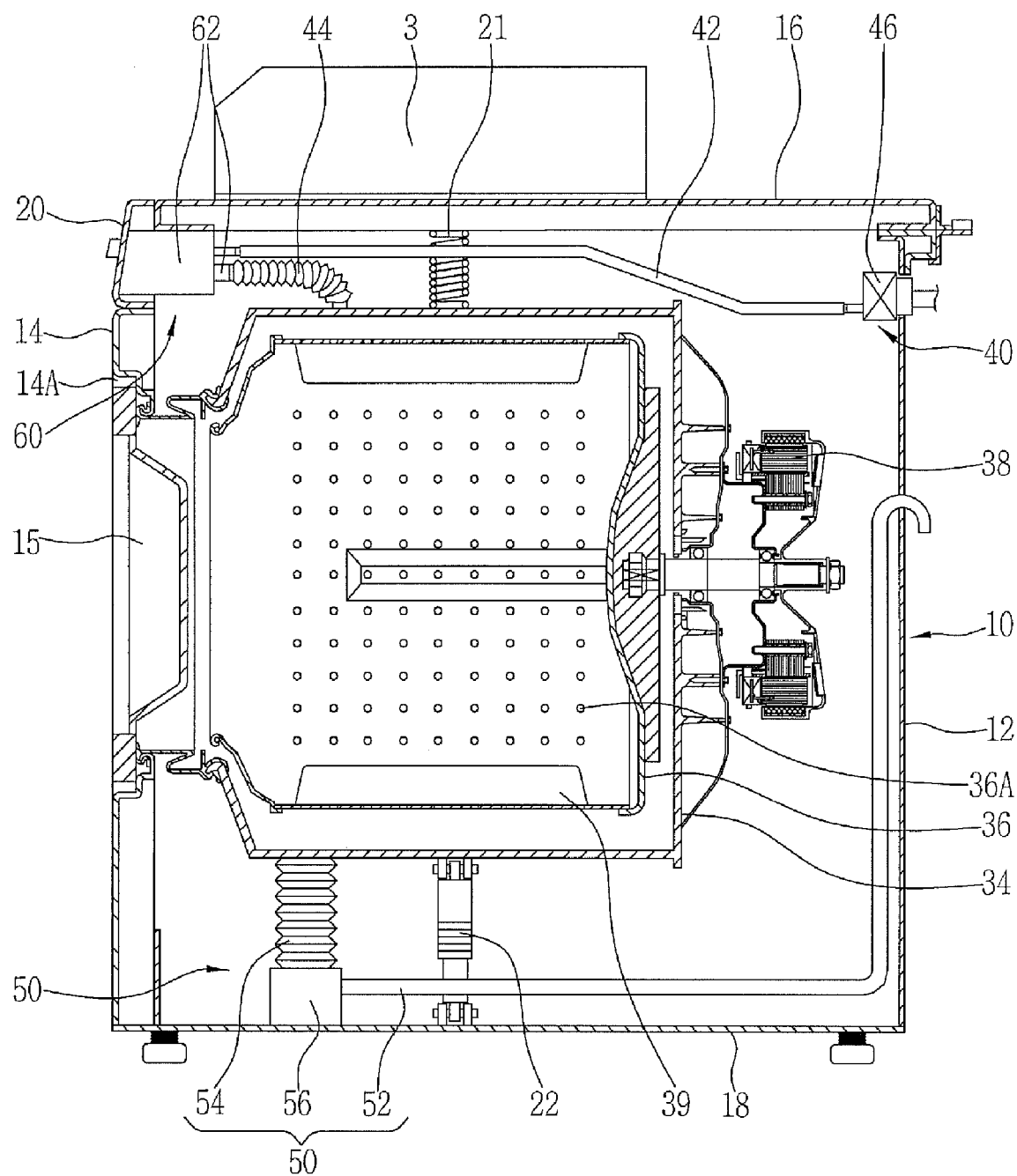
FIG. 3 is a side cross-sectional view of a commercial washer according to an embodiment of the present invention.
Figure 4:
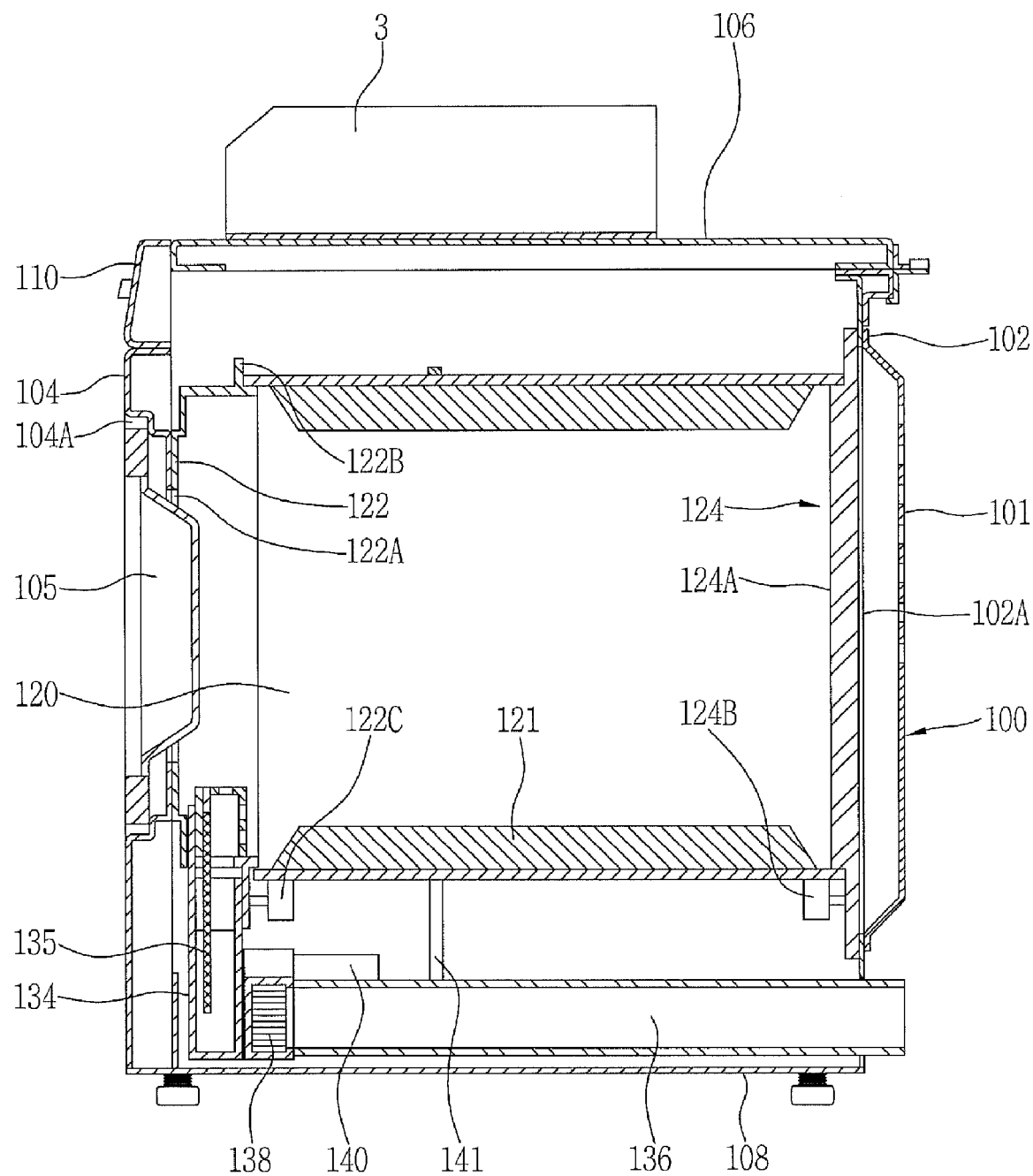
FIG. 4 is a side cross-sectional view of a commercial dryer according to an embodiment of the present invention.

FIG. 3 is a side cross-sectional view of a commercial washer according to an embodiment of the present invention, and FIG. 4 is a side cross-sectional view of a commercial dryer according to an embodiment of the present invention.

Referring to FIG. 3, the washer according to the present embodiment include a cabinet 10 forming the exterior of the washer, and a control panel 20 disposed at an upper front side of the washer for inputting information to control the operation of the washer and displaying information about the progress of washing operations at the same time. Also, the washer according to the present embodiment includes a tub 34 and a drum 36 disposed inside the cabinet 10 for receiving the laundry, and a motor 38 disposed at the read side of the tub 34 for rotating the drum 36. The motor 38 is controlled by a controller (not shown) embedded in the control panel 20.

In the cabinet 10, the washer according to the present invention includes a water supply unit 40 for supplying water to the tub 34, a drain unit 50 for draining water from the tub 34, and a detergent supply unit 60 for supplying a detergent into water supplied into the tub 34.

The cabinet 10 includes a case 12 having an opened front side, an opened top side, and a bottom side, which are opened, a front cover 14 for covering the opened front side of the case 12, a top plate 16 for covering the opened top side of the case 12, and a base 18 for covering the opened bottom side of the case 12. The front cover 14 also has an opening 14A for putting the laundry in the drum 36 and taking out the laundry from the drum 36.

A door 15 is rotatably connected to one side of the opening 14A of the front cover 14 in order to open or close the opening 14A of the front cover 14.

A spring 21 and a damper 22 elastically support the tub 34 disposed in the cabinet 10. The drum 36 includes a plurality of water holes 36A for letting wash pass through. The motor 38 is disposed at the rear side of the tub 34 for rotating the drum 36.

A plurality of lifters 39 are disposed on an inner circumference face of the drum 36. The lifters 39 lift up the laundry at a predetermined height and let the laundry to be free fallen by gravity. In generally, three lifters 39 are disposed.

The water supply unit 40 includes a water supply hose 42 and a water bellows 44 for guiding water from the external water source to the inside of the tub 34, and a water supply valve 46 disposed on the water supply hose 42 for opening and closing the water supply hose 42.

The detergent supply unit 60 is disposed between the water supply hose 42 and the water supply bellows 44 to communicate with each other in order to supply a detergent to the tub 34 with the water supplied by the water supply unit 40. The water supply hose 42 is disposed between the water supply valve 46 and the detergent supply unit 60 to guide the water to the detergent supply unit 60.

The detergent supply unit 60 includes a detergent box housing 62 having an opened front side connected to the water supply bellows 44 of the water supply unit 40 to communicate with each other, a detergent box (not shown) disposed in the detergent box housing 62 to be taken out therefrom in a front and rear direction for housing the detergent, and a dispenser cover (not shown) disposed at the opened front side of the detergent box housing 62 and connected to the water supply hose 42 of the water supply unit 40 to communicate with each other for draining water from the detergent box.

The drain unit 50 includes a drain hose 52 and a drain bellows 52 connected to the bottom of the tub 34 and penetrating the rear side of the cabinet 10 for guiding waste water to the outside, and a drain pump 56 for generating a draining power.

The washer includes the coin drop assembly 3 disposed on the top of the top plate and the card reader 4 disposed on the front side of the control panel 20. The controller (not shown) embedded in the control panel 10 provides an operating time according to a payment inserted into the coin drop assembly 3 and the card reader 4. The controller also controls the operation of the washer and displays information about handling of the payment to customers at the same time.

As described above, a manager can set the washer to change a user mode to a manager mode by turning a service key after inserting the service door key into a key hole 7 formed in the coin drop assembly 3, or by inserting a service card into the card reader 4.

In the manager mode, a manager can control operating conditions such as the rate and operating times. Also, a manager can collect money from the coin drop assembly 3.

Furthermore, in a manager mode, a manager can collect operating information through the communicator, where the operating information may include a collected payment for using the washer 1, a total running time of the washer 1, and a time of changing a user mode to a manager mode. A manager can read, modify, and manage such operating information collected through the communicator 5 through the PC 6.

As shown in FIG. 4, the dryer 2 includes a cabinet 100 for forming an exterior of the dryer 2 and a control panel 110 disposed on an upper front side of the cabinet 100 for inputting information to control the operation of the dryer 2 and displaying information about the progress of drying operation. In the cabinet 100, a drum 120, a drying space, is disposed rotatably by a motor 140. The motor 140 is connected by a controller (not shown) embedded in the control panel 110.

In the cabinet 100, a heater (not shown) is disposed to dry the laundry loaded in the drum 120, and a ventilator 138 is disposed to forcedly ventilate an air inside the drum 120. A channel (not shown) may be further disposed to circulate the air.

The cabinet 100 includes a case 102, a front cover 104 disposed at the front side of the case 102 and having an opening 104A, a top plate 106 disposed on the top side of the case 102, a base 108 disposed at the bottom of the case 102, and a back cover 101 for covering a center part of an opened rear side of the case 102.

A door 105 is rotatably connected to one side of the opening 104A of the front cover 104 to open and close the opening 104A of the front cover 104.

The drum 120 is formed in a barrel shape having a front side and a rear side opened. A transmission belt 141 is disposed between the motor 140 and the drum 120 to transfer the driving force from the motor 140 to the drum 120. Also, a plurality of lifters 121 are disposed inside the drum 120 to lift up the laundry loaded in the drum 120 at a predetermined height and to let the laundry to be free fallen to unwrinkle the laundry.

The front cover 104 is disposed at the opened front side of the drum 120 and a front supporter 122 having an opening 122A to enable a predetermined part of the door 105 to be inserted therein.

The front supporter 122 rotatably supports the drum 120 and covers the opened front side of the drum 120 with the door 105 that closes the opening 104A of the front cover 104.

That is, the front supporter 122 includes a ring shaped guiding protrusion 122B contacted to the front inner circumference face of the drum 120 for guiding the front side of the drum 120 to rotate, and a front guide roller 122C for lifting up the front side of the drum 120 from the bottom thereof for rotatably supporting the drum 120.

The opened rear side of the drum 120 is covered by a rear supporter 124 that is disposed at the rear side 102A of the case 102 and rotatably support the drum 120.

The rear supporter 124 includes a disk shaped guiding member 124A projected in a form of a step and contacted to a rear inside circumference of the drum 120 for guiding the rear side of the drum 120 to rotate, and a rear guide roller 124B lifting up the rear side of the drum 120 from the bottom for rotatably supporting the rear side of the drum 120.

The heater is disposed under the drum 120 and heats an air for drying the laundry loaded in the drum 120. The ventilator circulates the heated air along the channel to dry out humidity.

The channel is disposed to connect the heater to the rear supporter 124. The channel includes an air supply duct (not shown) for guiding an air heated by the heater to the inside of the drum 120, a lint duct 134 connected to the bottom of the front supporter 122 for inhaling the air from the drum 120, and an exhaust duct 136 connected to the lint duct 134 and penetrating the lower rear side of the case 102 for guiding the air in the lint duct 134 to the outside. The ventilator 138 is disposed between the exhaust duct 136 and the lint duct 134, rotatably with the drum 120 by the motor 140.

In general, a burner is used as the heater. Since the burner heats air through oxidation of gas to generate hot air is used, the heater is connected to the air supply duct 132 and a hollow fennel (not shown) to communicate with each other. The heater is also connected to the external gas supply source through a gas pipe (not shown).

A gas control valve (not shown) is disposed at the joint of the heater and the gas pipe to manually control the flow of gas. It is preferable that a filter 135 is disposed for purifying air inputted to the lint duct 134.

The dryer includes the coin drop assembly 3 disposed on the top of the top plate and the card reader 4 disposed on the front side of the control panel 20. The controller (not shown) embedded in the control panel 10 provides an operating time according to a payment inserted into the coin drop assembly 3 and the card reader 4. The controller also controls the operation of the dryer 2 and displays information about handling of the payment to customers at the same time.

As described above, a manager can set the dryer to change a user mode to a manager mode by turning a service key after inserting the service door key into a key hole 7 formed in the coin drop assembly 3, or by inserting a service card into the card reader 4. Like the washer, a manager can control operating conditions and collect money in the manager mode. Furthermore, in a manager mode, a manager can collect operating information through the communicator 5. A manager can read, modify, and manage such operating information collected through the communicator 5 through the PC 6.

Figure 5:
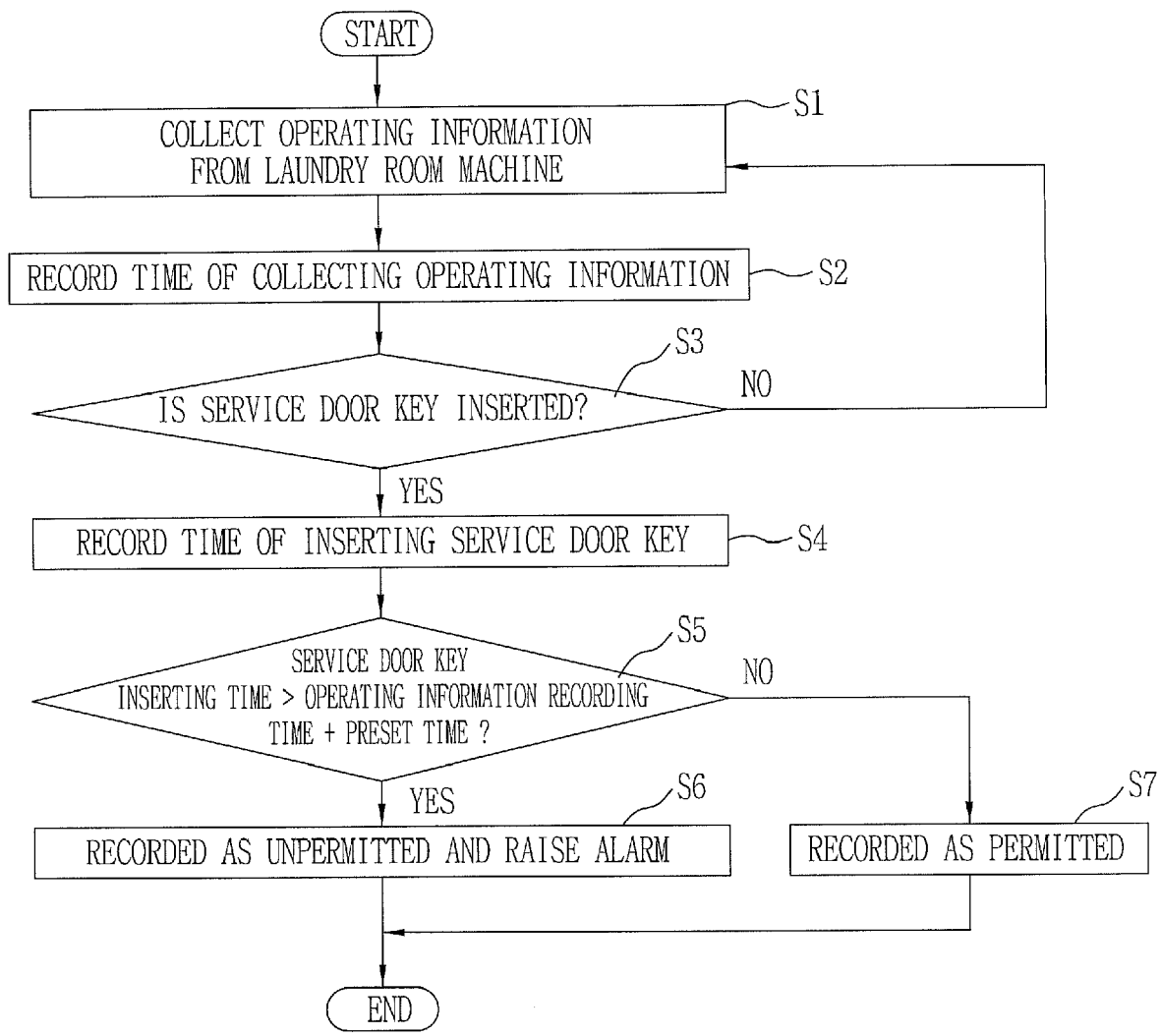
FIG. 5 is a flowchart illustrating a method of managing a commercial laundry room according to an embodiment of the present invention.

FIG. 5 is a flowchart illustrating a method of managing a laundry room machine according to an embodiment of the present invention. The method of managing the laundry room machine according to the present embodiment will be described with reference to FIG. 5.

At steps S1 and S2, operating information is collected from the laundry room machine and a time of collecting the operating information is recorded.

A manager collects the operating information from the washer 1 or the dryer 2 through the communicator 5. The operating information includes all of information about a total running time, a payment, checkup information, repair information, a time of activating a manager mode, a time of deactivating a manager mode, which are stored in the control panel of the washer 1 or the dryer 2.

That is, when the control panel receives a request of the operating information from the communicator 5, at least one of the operating information is transmitted to the communicator 5. Furthermore, the operating information of the washer 1 or the dryer 2 collected by the communicator 5 is transmitted to the PC 6 and managed by the PC 6.

The control panel of the washer 1 or the dryer 2 transmits the operating information to the communicator 5 and records a time of collecting the operating information at the same time. Then, the control panel counts a time from the time of collecting the operating information.

After the operating information is collected, a manager mode is activated and a time of activating the manager mode is recorded at steps S3, and S4.

An inactivated manager mode may be a user mode. It is preferable that the manager mode is activated and deactivated according to whether the service door key is inserted into the key hole 7 of the coin drop assembly or not.

Therefore, if the service door key is turned after the service door key is inserted into the key hole 7 of the coin drop assembly, the contact door 7 can be opened or closed. When the contact door 8 is opened, the limit switch 9 is turned off. The controller determines it as the manager mode is activated. Then, the controller records the time of activating the manager mode and starts to count a time after activating the manager mode.

Only if the limited switch 9 is turned off, coins can be collected from the coin drop assembly 3 by taking out a coin bolt.

If the manager mode is activated after a preset time elapses from the time of collecting the operating information at step S5, the activation of the manager mode is determined and recorded as an unpermitted operation and it raises alarm through various ways at step S6. If the manager mode is activated before a preset time elapses from the time of collecting the operating information at step S5, the activation of the manager mode is determined and recorded as a permitted operation at step S7.

A manager can set the preset time through the controller in consideration of a time of receiving operating information from the washer 1 or the dryer 2.

That is, if someone tries to open the coin drop assembly 3 using the service door key after the preset time elapses from the time of collecting the operating information by a manager using the communicator 5, the controller determines it as unpermitted operation. So, the controller records it as unpermitted operation and simultaneously reports it by playing predetermined sound, displaying text messages, and emitting light. Therefore, the washer or the dryer can be protected from a thief.

On the controller, if someone tries to open the coin drop assembly 3 using the service door key before the preset time elapses from the time of collecting the operating information by a manager using the communicator 5, the controller determines it as a permitted operation. Then, the controller records it as the permitted operation.

According to the method of managing laundry room machines of the present invention, the operating information can be easily collected from a plurality of laundry room machines having different operating information using the communicator such as a PDA connected to each of the laundry room machines. The collected operating information is transmitted to the PC and managed by the PC. Therefore, the operating information of the laundry room machines can be effectively and conveniently managed.

Also, if the service door key is inserted for collecting money from the coin drop assembly after the preset time elapses from the time of collecting the operating information from the laundry room machine, the controller of the laundry room machine determines it as the unpermitted operation, records it, and raises an alarm through various ways. Therefore, the laundry room machines can be protected from an unauthorized person to change and delete operating conditions and operating information and to steel money from the payment device, Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A method of managing a laundry room machine that performs at least one of a washing operation or a drying operation, the laundry room machine including a payment device that receives a payment for operation thereof, and a communicator that sets operating conditions and that collects operating information thereof, the method comprising:
   a) recording operating information of the laundry room machine;
   b) transmitting recorded operating information of the laundry room machine in response to a request from the communicator;
   c) recording a time of transmitting the recorded operating information of the laundry room machine to the communicator;
   d) activating a manager mode after recording the time of transmitting the recorded operating information of the laundry room machine, the manager mode being a mode enabling a manager to set operating conditions of the laundry room machine; and
   e) determining that an operation of activating the manager mode is an unpermitted operation when the activating of the manager mode is performed after a preset time elapses from the time of transmitting the recorded operating information.

2. The method of claim 1, wherein the payment device includes a coin drop assembly having a coin bolt such that activating the manager mode comprises inserting a service door key in the coin drop assembly.

3. The method of claim 1, further comprising:
   f) recording the operation of activating the manager mode as an unpermitted operation and reporting the unpermitted operation by at least one of emitting an alarm, displaying texts, or emitting light.

4. A commercial laundry room system, comprising:
   at least one laundry room machine that performs at least one of a washing operation or a drying operation;

a first interface that exchanges payment collecting information from a payment device provided with the at least one laundry room machine;

a second interface that exchanges operating information of the at least one laundry room machine with a communicator, wherein the communicator is configured to set operating conditions of the at least one laundry room machine and to receive operating information from the at least one laundry room machine; and a controller that controls operation of the at least one laundry room machine according to information provided by the first and second interfaces, that transmits operating information of the at least one laundry room machine to the communicator in response to a request from the communicator and records a time at which the requested operating information is transmitted to the communicator, that activates a manager mode after recording a time at which recorded operation information is transmitted to the communicator, and that determines that an operation of activating the manager mode is unpermitted when the activating of the manager mode is performed after a preset time has elapsed from the time of transmitting the recorded operating information, the manager mode being a mode enabling a manager to set operating conditions of the at least one laundry room machine.

5. The system of claim 4, wherein the at least one laundry room machine comprises a payment device that includes a coin drop assembly having a coin bolt, and wherein the coin drop assembly is configured to receive a service door key therein so as to activate the manager mode.

6. The system of claim 4, wherein the controller is configured to record the operation of activating the manager mode as an unpermitted operation.

7. The system of claim 4, wherein the at least one laundry room machine includes a reporting device that indicates an unpermitted operation by emitting an alarm, displaying texts, or emitting light.

8. The system of claim 4, wherein the at least one laundry room machine comprises a plurality of laundry room machines including a plurality of washing machines that perform washing operations and drying machines that perform drying operations.

9. The method of claim 2, further comprising:

determining that an operation of inserting the service door key is an unpermitted operation when the service door key is inserted into the coin drop assembly after a preset time elapses from a time of transmitting the recorded operating information; and reporting the unpermitted operation by at least one of emitting an alarm, displaying texts, or emitting light.

* * * * *